(12) United States Patent
Katou

(10) Patent No.: US 8,859,650 B2
(45) Date of Patent: Oct. 14, 2014

(54) RUBBER COMPOSITION FOR TIRE AND TIRE

(75) Inventor: Seiichi Katou, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 365 days.

(21) Appl. No.: 12/936,489

(22) PCT Filed: Apr. 6, 2009

(86) PCT No.: PCT/JP2009/057067
§ 371 (c)(1),
(2), (4) Date: Apr. 11, 2011

(87) PCT Pub. No.: WO2009/125747
PCT Pub. Date: Oct. 15, 2009

(65) Prior Publication Data
US 2011/0184084 A1    Jul. 28, 2011

(30) Foreign Application Priority Data

Apr. 7, 2008  (JP) ................. 2008-099535

(51) Int. Cl.
| | | |
|---|---|---|
| *C08K 5/01* | (2006.01) | |
| *B60C 1/00* | (2006.01) | |
| *C08L 21/00* | (2006.01) | |
| *C08L 9/06* | (2006.01) | |
| *C08L 61/00* | (2006.01) | |
| *C08L 57/02* | (2006.01) | |
| *C08L 91/00* | (2006.01) | |
| *C08L 65/00* | (2006.01) | |

(52) U.S. Cl.
CPC . *C08L 21/00* (2013.01); *C08K 5/01* (2013.01); *C08L 61/00* (2013.01); *B60C 1/0016* (2013.01); *C08L 57/02* (2013.01); *C08L 91/00* (2013.01); *C08L 9/06* (2013.01); *C08L 65/00* (2013.01)
USPC .......................................... 524/62; 524/495

(58) Field of Classification Search
CPC ............ B60C 1/0016; C08L 9/06; C09K 5/01
USPC .................................................. 524/64, 495
See application file for complete search history.

(56) References Cited

U.S. PATENT DOCUMENTS

| | | | |
|---|---|---|---|
| 6,939,910 B2 * | 9/2005 | Nakagawa ................ | 524/474 |
| 7,259,205 B1 | 8/2007 | Pagliarini et al. | |
| 7,371,791 B2 | 5/2008 | Hattori et al. | |
| 2005/0009978 A1 | 1/2005 | Weydert et al. | |
| 2006/0060285 A1 | 3/2006 | Weydert et al. | |
| 2006/0167160 A1 | 7/2006 | Nakagawa et al. | |
| 2006/0167163 A1 | 7/2006 | Ohashi et al. | |
| 2007/0037908 A1 | 2/2007 | Pille-Wolf | |

FOREIGN PATENT DOCUMENTS

| | | |
|---|---|---|
| JP | 2003-253050 A | 9/2003 |
| JP | 2003-253054 A | 9/2003 |
| JP | 2004-018760 A | 1/2004 |
| JP | 2004-161958 A | 6/2004 |
| JP | 2005-002295 A | 1/2005 |
| JP | 2005-023296 A | 1/2005 |
| JP | 2005-047968 A | 2/2005 |
| JP | 2005-162928 A | 6/2005 |
| JP | 2006-083393 A | 3/2006 |
| JP | 2007-262292 A | 10/2007 |

OTHER PUBLICATIONS

Extended European Search Report issued Feb. 24, 2012 in European Patent Application No. 09730292.1.

* cited by examiner

*Primary Examiner* — Edward Cain
(74) *Attorney, Agent, or Firm* — Sughrue Mion, PLLC

(57) ABSTRACT

A rubber composition for tires which comprises at least one rubber component selected from natural rubber and synthetic rubbers and, based on 100 parts by mass of the rubber component, 0.1 to 45 parts by mass of (A) a terpene phenol resin and 1 to 150 parts by mass of (B) a softener comprising a process oil which comprises polycyclic aromatic compounds (PCA) in an amount such that the content of extracts with dimethyl sulfoxide (DMSO) in accordance with the method of IP346 is controlled to a value smaller than 3%. A rubber composition for tires which overcomes problems arising due to the use of a highly aromatic oil having a content of polycyclic aromatic compounds (PCA) controlled to a value smaller than 3% as the process oil in place of conventional highly aromatic oils and exhibits excellent loss property and rigidity and a tire which uses the rubber composition and exhibits excellent steering stability on dry road surfaces and excellent braking property on wet road surfaces can be provided.

3 Claims, No Drawings

RUBBER COMPOSITION FOR TIRE AND TIRE

CROSS REFERENCE TO RELATED APPLICATION

This application is a National Stage of International Application No. PCT/JP2009/057067 filed Apr. 6, 2009, claiming priority based on Japanese Patent Application No. 2008-099535, filed Apr. 7, 2008, the contents of all of which are incorporated herein by reference in their entirety.

TECHNICAL FIELD

The present invention relates to a rubber composition for tires and a tire and, more particularly, to a rubber composition for tires which comprises an oil comprising a polycyclic aromatic compound (PCA) in an amount such that the content of extracts with dimethyl sulfoxide (DMSO) is smaller than 3% and a specific compound, and a tire using the rubber compound for the tread.

BACKGROUND ART

Heretofore, highly aromatic oils have been preferably used for rubber compositions for tires and other areas as the softener for rubber compositions and the extender for synthetic rubbers from the standpoint of providing the high loss property (the high hysteresis loss property) and affinity with the rubber.

Recently, the use of process oils having a content of extracts with DMSO smaller than 3% by mass, which are obtained by treating highly aromatic oil produced from petroleum as the raw material and called Treated Distilled Aromatic Extracts (TDAE) or Mild Extracted Solvates (MES), is increasing (for example, refer to Patent Reference 1).

However, the rubber compositions using a substitute oil such as TDAE and MES described above have a problem in that the temperature dependency of the viscoelastic properties of the rubber composition tends to shift to the low temperature side in comparison with that exhibited by the use of a conventional highly aromatic oil due to the lower softening point and smaller viscosity of the oil itself to cause decreases in the glass transition temperature (Tg) and the storage modulus (E'), and the wet skid resistance and the steering stability of the tire are decreased.

However, the rubber compositions using a substitute oil such as TDAE and MES described above have a problem in that the temperature dependency of the viscoelastic properties of the rubber composition tends to shift to the low temperature side in comparison with that exhibited by the use of a conventional highly aromatic oil due to the lower softening point and smaller viscosity of the oil itself to cause decreases in the glass transition temperature (Tg) and the storage modulus (E') with increase in the amount of the use, and the wet skid resistance and the steering stability of the tire are decreased.

When a conventional method for increasing the storage modulus, for example, increasing the amount of a reinforcing filler such as carbon black and silica or decreasing the amount of an oil, is conducted to overcome the decrease in the steering stability, viscosity of the unvulcanized rubber is increased, and workability in plants deteriorates markedly.
[Patent Reference 1] Japanese Patent Application Laid-Open No. Heisei 11(1999)-302459

DISCLOSURE OF THE INVENTION

Problems to be Overcome by the Invention

Under the above circumstances, the present invention has an object of providing a rubber composition for tires which overcomes problems arising due to the use of a highly aromatic oil having a content of polycyclic aromatic compounds (PCA) smaller than 3% as a process oil in place of conventional highly aromatic oils and exhibits excellent loss property and rigidity and a tire which uses the rubber composition exhibiting the above properties and exhibits excellent steering stability on dry road surfaces and excellent braking property on wet road surfaces.

Means for Overcoming the Problems

As the result of intensive studies by the present inventors to achieve the above object, it was found that the above object could be achieved by using a specific amount of a specific resin and a specific amount of a softener which comprised a process oil comprising polycyclic aromatic compounds (PCA) in an amount such that the content of extracts with DMS was smaller than 3%, the specific amounts being based on 100 parts by mass of at least one rubber component selected from natural rubber and synthetic rubbers. The present invention has been completed based on the knowledge.

The present invention provides:
(1) A rubber composition for tires which comprises at least one rubber component selected from natural rubber and synthetic rubbers and, based on 100 parts by mass of the rubber component, 0.1 to 45 parts by mass of (A) a terpene phenol resin and 1 to 150 parts by mass of (B) a softener comprising a process oil which comprises polycyclic aromatic compounds (PCA) in an amount such that a content of extracts with dimethyl sulfoxide (DMSO) in accordance with a method of IP346 is controlled to a value smaller than 3%;
(2) A rubber composition for tires described in (1), wherein a softening point of the terpene phenol resin of Component (A) is 80° C. or higher;
(3) A rubber composition for tires described in any one of (1) and (2), wherein a softening point of the terpene phenol resin of Component (A) is in a range of 100 to 150° C.;
(4) A rubber composition for tires described in any one of (1) to (3), wherein an OH-value (KOH mg/g) of the terpene phenol resin of Component (A) is 20 to 250;
(5) A rubber composition for tires described in (4), wherein an OH-value (KOH mg/g) of the terpene phenol resin of Component (A) is 40 to 150;
(6) A rubber composition for tires described in (1), which comprises 1 to 100 parts by mass of the softener of Component (B) comprising a process oil which comprises polycyclic aromatic compounds (PCA) in an amount such that a content of extracts with DMSO is controlled to a value smaller than 3%;
(7) A rubber composition for tires described in any one of (1) to (6), wherein the process oil which comprises PCA in an amount such that a content of extracts with DMSO is smaller than 3% is at least one process oil selected from mild extracted solvates (MES), treated distilled aromatic extracts (TDAE) and heavy naphthenic oils;
(8) A rubber composition for tires described in any one of (1) to (7), wherein the softener of Component (B) comprises hydrogenated naphthenic oil;

(9) A rubber composition for tires described in (8), wherein the hydrogenated naphthenic oil is obtained by hydrogenation of naphthenic oil having a content of naphthenic hydrocarbons (% CN) of 30 or greater as measured in accordance with a method of ASTM D4210;

(10) A rubber composition for tires described in any one of (1) to (9), wherein the softener of Component (B) further comprises asphalt having a kinematic viscosity of 300 mm$^2$/sec or smaller at 120° C. and comprising 5% by mass or smaller of asphaltene, and a ratio of amounts by mass of the hydrogenated naphthenic oil to the asphalt is in a range of 95/5 to 5/95; and

(11) A tire which uses a composition for tires described in any one of (1) to (10) for a tread.

The Effect of the Invention

In accordance with the present invention, the rubber composition for tires which overcomes problems arising due to the use of a highly aromatic oil having a content of polycyclic aromatic compounds (PCA) controlled to a value smaller than 3% as the process oil in place of conventional highly aromatic oils and exhibits excellent loss property and rigidity and a tire which uses the rubber composition and exhibits excellent steering stability on dry road surfaces and excellent braking property on wet road surfaces can be provided.

THE MOST PREFERRED EMBODIMENT TO CARRY OUT THE INVENTION

It is necessary that the rubber composition of the present invention comprises at least one rubber component selected from natural rubber and synthetic rubbers and, based on 100 parts by mass of the rubber component, 0.1 to 45 parts by mass of (A) a terpene phenol resin and 1 to 150 parts by mass of (B) a softener comprising a process oil which comprises PCA in an amount such that a content of extracts with DMSO in accordance with a method of IP346 is controlled to a value smaller than 3%.

<Rubber Component>

In the rubber composition of the present invention, natural rubber and synthetic rubbers are used as the rubber component. Examples of the synthetic rubber include diene-based rubbers such as synthetic isoprene rubber, polybutadiene rubber, solution polymerization styrene-butadiene rubber and emulsion polymerization styrene-butadiene rubber. Among these synthetic rubbers, the styrene-butadiene copolymer rubber produced in accordance with the emulsion polymerization is preferable from the standpoint of the balance between various properties of the tire tread. The rubber component may be used singly or in combination of two or more.

<Terpene Phenol Resin>

In the present invention, it is necessary that the rubber composition comprises 0.1 to 45 parts by mass of a terpene phenol resin as Component (A) based on 100 parts by mass of the rubber component so that the rubber composition surely exhibits the desired loss property and the desired rigidity. When the amount is smaller than 0.1 part by mass, the desired effects as the object of the present invention are not obtained. When the amount exceeds 45 parts by mass, the effects expected from the increased amount are not obtained. Moreover, the desired loss property is not obtained, and the braking property on wet road surfaces as a property of the tire tends to decrease. It is preferable that the amount of the terpene phenol resin is 4 to 30 parts by mass and more preferably 5 to 20 parts by mass from the above standpoint.

As the above terpene phenol resins, terpene phenol resins having a softening point of 80° C. or higher is preferable, and terpene phenol resins having a softening pint of 100 to 150° C. are more preferable from the standpoint of the balance between the loss property and the rigidity. It is preferable that the OH value of the terpene phenol resin is 20 to 250 and more preferably 40 to 150. When the above properties are within the above ranges, the rubber composition of the present invention exhibits excellent balance between the loss property and the rigidity both in excellent levels.

The terpene monomer as the raw material of the terpene phenol resin is not particularly limited. It is preferable that the terpene monomer is a monoterpene hydrocarbon such as α-pinene and limonene. From the standpoint of the excellent balance between the loss property and the rigidity, raw monomers comprising α-pinene are more preferable, and α-pinene is most preferable.

As the terpene phenol resin described above, resins of various grades are available as commercial products such as "YS POLYSTER" and "MIGHTYACE G" manufactured by YASUHARA CHEMICAL Co., Ltd.

<Process Oil Comprising a Suppressed Amount of PCA>

It is necessary that, in the rubber composition of the present invention, a softener comprising an oil having a content of extracts with DMSO in accordance with the method of IP346 [the PCA components (polycyclic aromatic compounds)] controlled to a value smaller than 3% by mass is used as Component (B) in an amount of 1 to 150 parts by mass, preferably 1 to 100 parts by mass and more preferably 30 to 70 parts by mass based on 100 parts by mass of the rubber component. When the amount of the oil is less than 1 part by mass, dispersion of the rubber is poor, and the rubber is hardened to decrease the wet gripping property. When the amount of the oil exceeds 150 parts by mass, the rubber composition is softened, and the steering property is decreased.

As the oil having the content of the extracts with DMSO controlled to a value smaller than 3% by mass, for example, mild extracted solvates (MES), treated distilled aromatic extracts (TDAE) and heavy naphthenic oils are preferable.

<Hydrogenated Naphthenic Oil>

It is preferable that the softener of Component (B) comprises a hydrogenated naphthenic oil. The hydrogenated naphthenic oil can be obtained by hydrorefining a naphthenic oil in accordance with the hydrorefining technology at a high temperature under a high pressure. As the naphthenic oil used for the hydrorefining, naphthenic oils having a content of naphthenic hydrocarbons (% CN) of 30 or greater as measured in accordance with the method of ASTM D2140 (known as the ring analysis) is preferable.

As for the amount of the hydrogenated naphthenic oil, it is preferable that the hydrogenated naphthenic oil is used in an amount in the range of 20 to 70% by mass based on the amount of the oil having a content of extracts with DMSO smaller than 3% by mass described above. Specifically, the hydrogenated naphthenic oil is available as commercial products such as SNH8, CNH46, SNH220 and SNH440 (all trade names) manufactured by SANKYO YUKA KOGYO K. K.

<Asphalt>

The softener may further comprise asphalt. It is preferable that the asphalt has a content of asphaltene components of 5% by mass or smaller from the standpoint of the compatibility with synthetic rubbers used and the effect as the softener. The asphaltene components can be determined by the composition analysis in accordance with the method of JPI (the method of the Japan Petroleum Institute). As the asphalt, naphthenic straight asphalt is preferable. It is also preferable that the kinematic viscosity at 120° C. is 300 mm²/sec or smaller.

It is preferable that the amount of the asphalt expressed as the ratio of the amounts by mass of the hydrogenated naphthenic oil to the asphalt is in the range of 95/5 to 5/95. When the amount of the asphalt exceeds 95% by mass, a problem arises with respect to the compatibility with synthetic rubbers and the effect is decreased, occasionally.

The method of mixing the asphalt in the softener is not particularly limited. Although the asphalt may be added to the hydrogenated naphthenic oil in advance, or the softener may be prepared in the presence of suitable relative amounts of main components of the asphalt in the hydrogenated naphthenic oil in the conventional process of refining the hydrogenated naphthenic oil, it is preferable that the preparation is conducted by dissolving the asphalt into the hydrogenated naphthenic oil (including extender oil and compound oil) from the standpoint of the easiness of the preparation of the softener and the economy.

In the rubber composition for tires of the present invention, it is preferable that the softener of Component (B) comprises (1) the oil having a content of extracts with DMSO smaller than 3% by mass, (2) the hydrogenated naphthenic oil and (3) the asphalt in amounts such that the sum of the amounts of the three components is 5 to 70 parts by mass based on 100 parts by mass of the rubber component. When the sum of the amounts is outside the above range, it becomes difficult that excellent properties are obtained with respect to both of the fracture property and the abrasion property.

The terpene phenol resin described above exhibits excellent dispersion of the resin in the process oil which comprises the component of polycyclic aromatic compounds (PCA) in an amount such that the content of extracts with DMSO is smaller than 3%, and it is made possible that the excellent wet gripping property and the excellent steering stability are simultaneously exhibited. In contrast, phenol resins always cause hardening of the rubber due to poor dispersion into the oils, and the wet gripping property is decreased. Terpene oils always cause softening of the rubber due to excessively good dispersion into the oils, and the steering stability is decreased. In particular, the characteristics of the resins are enhanced when the amount of the oil is great (20 parts by mass or greater).

In the rubber composition for tires of the present invention, carbon black and/or silica can be used as the reinforcing filler. As the amount of the reinforcing filler, it is preferable that the filler is used in an amount of 50 to 150 parts by mass, more preferably 60 to 100 parts by mass and most preferably 60 to 80 parts by mass based on 100 parts by mass of the rubber component.

Among the reinforcing fillers, carbon black is preferable. As the amount of carbon black, it is preferable that carbon black is used in an amount of 10 to 150 parts by mass, more preferably 60 to 100 parts by mass and most preferably 60 to 80 parts by mass based on 100 parts by mass of the rubber component.

As the sum of the amounts of carbon black and silica, the sum of the amounts is, in general, 30 to 120 parts by mass and preferably 40 to 100 parts by mass based on 100 parts by mass of the rubber component. Excellent abrasion resistance, excellent steering stability, a decreased rolling resistance and an increased wet skid resistance can be obtained by the combined use of carbon black and silica in amounts in the above range.

Examples of carbon black include FEF, SRF, HAF, ISAF and SAF. Among these carbon blacks, HAF, ISAF and SAF are preferable due to the excellent abrasion resistance. When silica is used, it is preferable that a silane coupling agent is used in combination.

The rubber composition for tires of the present invention may further comprise various additives conventionally used in the rubber industry such as vulcanizing agents, vulcanization accelerators, antioxidants, antiscorching agents, softeners, zinc oxide and stearic acid as long as the object of the present invention is not adversely affected. The rubber composition for tires of the present invention is advantageously used for the tread rubber and the tread base rubber in tires. The tire of the present invention can be produced in accordance with the conventional process. The rubber composition for tires of the present invention comprising various chemicals as described above is, where necessary, extruded to form a member for the tread and formed on a tire former to obtain a green tire in accordance with the conventional process while the rubber composition remains unvulcanized. The green tire is heated under a pressure in a vulcanizing press, and a tire is obtained.

As the gas inflating the tire, the air, the air having an adjusted partial pressure of oxygen or an inert gas such as nitrogen gas can be used.

EXAMPLES

The present invention will be described more specifically with reference to examples in the following. However, the present invention is not limited to the examples. Various measurements and evaluations were conducted in accordance with the methods described in the following.

1. Evaluation of the Properties of a Rubber Composition
<Loss Property: Measurement of tan δ at 0° C.>

Using a viscoelasticity tester [manufactured by TOYO SEIKI SEISAKU-SHO Ltd.; RHEOGRAPH Solid L-1R type], tan δ (the dynamic loss property) at 0° C. was measured under the condition of a strain of 5% and a frequency of 15 Hz using a sheet of a vulcanized rubber (5 mm×45 mm×2 mm) as the test piece.

The result was expressed as an index based on the result of Comparative Example 1 (Table 1) or Comparative Example 12 (Table 2) used as the reference, which was set at 100. The greater the index, the more excellent the loss property.
<Measurement of Storage Modulus (E') at 30° C.>

Using SPECTROMETER (manufactured by TOYO SEIKI SEISAKU-SHO Ltd.), the storage modulus (E') was measured under the condition of a temperature of 30° C., a dynamic strain of 1% and a frequency of 15 Hz. The result was expressed as an index based on the result of Comparative Example 1 (Table 1) or Comparative Example 12 (Table 2) used as the reference, which was set at 100. The greater the index, the greater the rigidity.

2. Evaluation of the Properties of a Tire>
<Steering Stability on Dry Road Surfaces>

A tire was attached to a vehicle and driven on dry road surfaces in a test course (the tire size: 195/65R15). The driving property, the braking property, the steering response and the braking property during steering were evaluated, and a point in the range of 1 to 10 was given to each item of the evaluation. The obtained points were averaged, and the value expressing the steering stability was obtained.

The greater the value, the more excellent the steering stability.
<Braking Property on Wet Road Surfaces>

Test tires (the tire size: 195/65R15; the pressure of inflation: 196 kPa) were mounted at four wheels of a passenger car, and the braking distance was measured at the initial speed of 70 km on a wet road surface in a test course. The result as the inverse of the braking distance was expressed as an index based on the result of Comparative Example 1 (Table 1) or Comparative Example 12 (Table 2) used as the reference, which was set at 100. The greater the index, the shorter the braking distance and the more excellent the braking property on wet road surfaces.

Example 1 to 18 and Comparative Examples 1 to 11

The Rubber Component: Styrene-Butadiene Rubber

Rubber compositions of Examples and Comparative Examples were prepared based on the formulations shown in Table 1 in accordance with the conventional process.

The rubber compositions were vulcanized in accordance with the conventional process, and samples for the tests were prepared. Using each prepared sample, tan δ at 0° C. and the storage modulus (E') at 30° C. were measured. The results are shown in Table 1.

Then, using the obtained rubber compositions for the tread, radial tires for passenger cars (the tire size: 195/65R15) for testing was prepared in accordance with the conventional process. Using the obtained tires, the steering stability on dry road surfaces and the braking property on wet road surfaces were evaluated. The results of the evaluation are shown in Table 1.

Example 19 to 26 and Comparative Examples 12 to 14

The Rubber Component: Natural Rubber and Styrene-Butadiene Rubber

Based on the formulations shown in Table 2, tan δ at 0° C. and the storage modulus (E') at 30° C. were measured in accordance with the same procedures as those conducted in Example 1 to 18 and Comparative Examples 1 to 11, and the steering stability on dry road surfaces and the braking property on wet road surfaces were evaluated using prepared tires in accordance with the same procedures as those conducted in Example 1 to 18 and Comparative Examples 1 to 11. The results of the evaluation are shown in Table 2.

TABLE 1-1

| Example | | 1 | 2 | 3 | 4 | 5 | 6 | 7 | 8 | 9 |
|---|---|---|---|---|---|---|---|---|---|---|
| Comparative Example | 1 | | | | | | | | | |
| Formulation (parts by mass) | | | | | | | | | | |
| styrene-butadiene copolymer rubber *1 | 100 | 100 | 100 | 100 | 100 | 100 | 100 | 100 | 100 | 100 |
| carbon black *2 | 50 | 50 | 50 | 50 | 50 | 50 | 50 | 50 | 50 | 50 |
| aromatic oil | 30 | — | — | — | — | — | — | — | — | — |
| Oil A *3 | — | 30 | 30 | 30 | 30 | 30 | 30 | 30 | 120 | — |
| Oil B *4 | — | — | — | — | — | — | — | — | — | 30 |
| Oil C *5 | — | — | — | — | — | — | — | — | — | — |
| Oil D *6 | — | — | — | — | — | — | — | — | — | — |
| Oil E *7 | — | — | — | — | — | — | — | — | — | — |
| Resin A *8 | — | 5 | 45 | — | — | — | — | — | — | 20 |
| Resin B *9 | — | — | — | 5 | — | — | — | — | — | — |
| Resin C *10 | — | — | — | — | 5 | — | — | — | — | — |
| Resin D *11 | — | — | — | — | — | 5 | — | — | — | — |
| Resin E *12 | — | — | — | — | — | — | 5 | — | — | — |
| Resin F *13 | — | — | — | — | — | — | — | 5 | — | — |
| Resin G *14 | — | — | — | — | — | — | — | — | — | — |
| Resin H *15 | — | — | — | — | — | — | — | — | — | — |
| stearic acid | 1.5 | 1.5 | 1.5 | 1.5 | 1.5 | 1.5 | 1.5 | 1.5 | 1.5 | 1.5 |
| zinc oxide | 3 | 3 | 3 | 3 | 3 | 3 | 3 | 3 | 3 | 3 |
| antioxidant *16 | 1 | 1 | 1 | 1 | 1 | 1 | 1 | 1 | 1 | 1 |
| Vulcanization accelerator A *17 | 1.5 | 1.5 | 1.5 | 1.5 | 1.5 | 1.5 | 1.5 | 1.5 | 1.5 | 1.5 |
| Vulcanization accelerator B *18 | 1.5 | 1.5 | 1.5 | 1.5 | 1.5 | 1.5 | 1.5 | 1.5 | 1.5 | 1.5 |
| sulfur | 1.8 | 1.8 | 1.8 | 1.8 | 1.8 | 1.8 | 1.8 | 1.8 | 1.8 | 1.8 |
| Results of evaluation | | | | | | | | | | |
| tan δ (0° C.) (index) | 100 | 110 | 108 | 112 | 114 | 114 | 108 | 116 | 112 | 108 |
| storage modulus (E') (index) | 100 | 108 | 121 | 106 | 105 | 102 | 110 | 104 | 100 | 111 |
| steering stability on dry road surfaces | 5 | 8 | 6 | 7 | 7 | 6 | 8 | 7 | 5 | 8 |
| braking property on wet road surfaces (index) | 100 | 108 | 101 | 110 | 114 | 114 | 105 | 115 | 109 | 107 |

TABLE 1-2

| Example Comparative Example | 10 | 11 | 12 | 13 | 14 | 15 | 16 | 17 | 18 |
|---|---|---|---|---|---|---|---|---|---|
| Formulation (parts by mass) | | | | | | | | | |
| styrene-butadiene copolymer rubber *1 | 100 | 100 | 100 | 100 | 100 | 100 | 100 | 100 | 100 |
| carbon black *2 | 50 | 50 | 50 | 50 | 50 | 50 | 50 | 50 | 50 |
| aromatic oil | — | — | — | — | — | — | — | — | — |
| Oil A *3 | — | — | — | — | — | — | — | — | — |
| Oil B *4 | 30 | 30 | 30 | — | — | — | — | — | — |
| Oil C *5 | — | — | — | 30 | — | — | 30 | — | — |
| Oil D *6 | — | — | — | — | 30 | — | — | 30 | — |
| Oil E *7 | — | — | — | — | — | 30 | — | — | 30 |
| Resin A *8 | — | — | — | — | — | — | — | — | — |
| Resin B *9 | 20 | — | — | 5 | 5 | 5 | — | — | — |
| Resin C *10 | — | — | — | — | — | — | 5 | 5 | 5 |
| Resin D *11 | — | — | — | — | — | — | — | — | — |
| Resin E *12 | — | 20 | — | — | — | — | — | — | — |
| Resin F *13 | — | — | 20 | — | — | — | — | — | — |
| Resin G *14 | — | — | — | — | — | — | — | — | — |
| Resin H *15 | — | — | — | — | — | — | — | — | — |
| stearic acid | 1.5 | 1.5 | 1.5 | 1.5 | 1.5 | 1.5 | 1.5 | 1.5 | 1.5 |
| zinc oxide | 3 | 3 | 3 | 3 | 3 | 3 | 3 | 3 | 3 |
| antioxidant *16 | 1 | 1 | 1 | 1 | 1 | 1 | 1 | 1 | 1 |
| Vulcanization accelerator A *17 | 1.5 | 1.5 | 1.5 | 1.5 | 1.5 | 1.5 | 1.5 | 1.5 | 1.5 |
| Vulcanization accelerator B *18 | 1.5 | 1.5 | 1.5 | 1.5 | 1.5 | 1.5 | 1.5 | 1.5 | 1.5 |
| sulfur | 1.8 | 1.8 | 1.8 | 1.8 | 1.8 | 1.8 | 1.8 | 1.8 | 1.8 |
| Results of evaluation | | | | | | | | | |
| tan δ (0° C.) (index) | 108 | 107 | 114 | 110 | 114 | 113 | 110 | 112 | 112 |
| storage modulus (E') (index) | 108 | 110 | 106 | 116 | 119 | 112 | 106 | 106 | 105 |
| steering stability on dry road surfaces | 7 | 6 | 7 | 8 | 7 | 8 | 7 | 7 | 7 |
| braking property on wet road surfaces (index) | 109 | 108 | 113 | 108 | 109 | 109 | 107 | 108 | 107 |

[Notes]
*1 Styrene-butadiene rubber; emulsion polymerization SBR #1500; manufactured by JSR Corporation
*2 Carbon black; N234; the trade name: "ASAHI #78"; manufactured by ASAHI CARBON Co., Ltd.
*3 Oil A; T-DAE (treated distilled aromatic extracts); a process oil having a content of extracts with DMSO smaller than 3%; manufactured by IDEMITSU KOSAN Co., Ltd.
*4 Oil B; a blend of a hydrogenated naphthenic oil and asphalt (the content of asphaltene: 5% or smaller), ratio of the amounts by mass of the hydrogenated naphthenic oil to the asphalt being 50/50; (the content of extracts with DMSO: 1,8%)
*5 Oil C; a hydrogenated naphthenic oil; "SNH220"; manufactured by SANKYO YUKA KOGYO K.K.; the content of naphthenic hydrocarbons (% CN): 44%; (the content of extracts with DMSO: 2.2%)
*6 Oil D; a hydrogenated naphthenic oil; "SNH8"; manufactured by SANKYO YUKA KOGYO K.K.; the content of naphthenic hydrocarbons (% CN): 58%; (the content of extracts with DMSO: 1.9%)
*7 Oil E; a paraffinic oil; "SUPER OIL Y22"; manufactured by NIPPON OIL Corporation; (the amount of extracts with DMSO: 2.1%)
*8 Resin A; "YS POLYSTER S145"; a terpene phenol copolymer; manufactured by YASUHARA CHEMICAL Co., Ltd.; the softening point: 145° C., the OH value: 12 [mg KOH/g]
*9 Resin B; "YS POLYSTER T145"; a terpene phenol copolymer; manufactured by YASUHARA CHEMICAL Co., Ltd.; the softening point: 145° C., the OH value: 70 [mg KOH/g]
*10 Resin C; "YS POLYSTER T100"; a terpene phenol copolymer; manufactured by YASUHARA CHEMICAL Co., Ltd.; the softening point: 100° C., the OH value: 70 [mg KOH/g]
*11 Resin D; "YS POLYSTER T80"; a terpene phenol copolymer; manufactured by YASUHARA CHEMICAL Co., Ltd.; the softening point: 80° C., the OH value: 70 [mg KOH/g]
*12 Resin E; "MIGHTYACE G125"; a terpene phenol copolymer; manufactured by YASUHARA CHEMICAL Co., Ltd.; the softening point: 125° C., the OH value: 140 [mg KOH/g]
*13 Resin F; "YS POLYSTER U115"; a terpene phenol copolymer; manufactured by YASUHARA CHEMICAL Co., Ltd.; the softening point: 115° C., the OH value: 20 [mg KOH/g]
*16 An antioxidant; "NOCRAC 6C"; manufactured by OUCHI SHINKO CHEMICAL INDUSTRIAL Co., Ltd.; N-(1,3-dimethylbutyl)-N'-phenyl-p-phenylenediamine
*17 Vulcanization accelerator A; "NOCCELOR NS-F"; manufactured by OUCHI SHINKO CHEMICAL INDUSTRIAL Co., Ltd.; N-t-butyl-2-benzothiazyl sulfenamide
*18 Vulcanization accelerator B; "NOCCELOR TOT"; manufactured by OUCHI SHINKO CHEMICAL INDUSTRIAL Co., Ltd.; tetrakis-2-ethylhexylthiuram disulfide

TABLE 1-3

| Example Comparative Example | 1 | 2 | 3 | 4 | 5 | 6 | 7 | 8 | 9 | 10 | 11 |
|---|---|---|---|---|---|---|---|---|---|---|---|
| Formulation (parts by mass) | | | | | | | | | | | |
| styrene-butadiene copolymer rubber *1 | 100 | 100 | 100 | 100 | 100 | 100 | 100 | 100 | 100 | 100 | 100 |
| carbon black *2 | 50 | 50 | 50 | 50 | 50 | 50 | 50 | 50 | 50 | 50 | 50 |
| aromatic oil | 30 | — | — | — | — | — | — | — | — | — | — |
| Oil A *3 | — | 30 | — | 30 | 30 | — | 30 | — | 160 | 0.5 | 30 |
| Oil B *4 | — | — | 30 | — | 30 | — | 30 | — | — | — | — |

TABLE 1-3-continued

| Example Comparative Example | 1 | 2 | 3 | 4 | 5 | 6 | 7 | 8 | 9 | 10 | 11 |
|---|---|---|---|---|---|---|---|---|---|---|---|
| Oil C *5 | — | — | — | — | — | — | — | — | — | — | — |
| Oil D *6 | — | — | — | — | — | — | — | — | — | — | — |
| Oil E *7 | — | — | — | — | — | — | — | — | — | — | — |
| Resin A *8 | — | — | — | 50 | — | — | — | — | 5 | 5 | 50 |
| Resin B *9 | — | — | — | — | — | — | — | — | — | — | — |
| Resin C *10 | — | — | — | — | — | — | — | — | — | — | — |
| Resin D *11 | — | — | — | — | — | — | — | — | — | — | — |
| Resin E *12 | — | — | — | — | — | — | — | — | — | — | — |
| Resin F *13 | — | — | — | — | — | — | — | — | — | — | — |
| Resin G *14 | — | — | — | — | 5 | 20 | — | — | — | — | — |
| Resin H *15 | — | — | — | — | — | — | 5 | 20 | — | — | — |
| stearic acid | 1.5 | 1.5 | 1.5 | 1.5 | 1.5 | 1.5 | 1.5 | 1.5 | 1.5 | 1.5 | 1.5 |
| zinc oxide | 3 | 3 | 3 | 3 | 3 | 3 | 3 | 3 | 3 | 3 | 3 |
| antioxidant *16 | 1 | 1 | 1 | 1 | 1 | 1 | 1 | 1 | 1 | 1 | 1 |
| Vulcanization accelerator A *17 | 1.5 | 1.5 | 1.5 | 1.5 | 1.5 | 1.5 | 1.5 | 1.5 | 1.5 | 1.5 | 1.5 |
| Vulcanization accelerator B *18 | 1.5 | 1.5 | 1.5 | 1.5 | 1.5 | 1.5 | 1.5 | 1.5 | 1.5 | 1.5 | 1.5 |
| sulfur | 1.8 | 1.8 | 1.8 | 1.8 | 1.8 | 1.8 | 1.8 | 1.8 | 1.8 | 1.8 | 1.8 |
| Results of evaluation | | | | | | | | | | | |
| tan δ (0° C.) (index) | 100 | 101 | 101 | 95 | 90 | 85 | 112 | 110 | 130 | 97 | 74 |
| storage modulus (E') (index) | 100 | 88 | 92 | 140 | 100 | 114 | 85 | 84 | 72 | 106 | 132 |
| steering stability on dry road surfaces | 5 | 3 | 3 | 3 | 6 | 5 | 3 | 4 | 2 | 6 | 4 |
| braking property on wet road surfaces (index) | 100 | 102 | 98 | 90 | 85 | 82 | 108 | 107 | 115 | 96 | 79 |

[Notes]
*14 Resin G; "SUMILITE RESIN PR50235A"; a phenol resin; manufactured by SUMITOMO BAKELITE Co., Ltd.; the softening point: 95° C.
*15 "YS RESIN PX1000"; a terpene resin; manufactured by YASUHARA CHEMICAL Co., Ltd.

TABLE 2

| Example Comparative Example | 12 | 13 | 14 | 19 | 20 | 21 | 22 | 23 | 24 | 25 | 26 |
|---|---|---|---|---|---|---|---|---|---|---|---|
| Formulation (parts by mass) | | | | | | | | | | | |
| natural rubber | 80 | 80 | 80 | 80 | 80 | 80 | 80 | 80 | 80 | 80 | 80 |
| butadiene rubber *19 | 20 | 20 | 20 | 20 | 20 | 20 | 20 | 20 | 20 | 20 | 20 |
| carbon black *20 | 45 | 45 | 45 | 45 | 45 | 45 | 45 | 45 | 45 | 45 | 45 |
| aromatic oil | 10 | — | — | — | — | — | — | — | — | — | — |
| Oil A *3 | — | 10 | — | 10 | 10 | — | — | — | — | — | — |
| Oil B *4 | — | — | 10 | — | — | 10 | 10 | 10 | 10 | 10 | 10 |
| Resin A *8 | — | — | — | — | — | 4 | — | — | — | — | — |
| Resin B *9 | — | — | — | — | 4 | — | — | 4 | — | — | — |
| Resin C *10 | — | — | — | — | — | — | — | — | 4 | — | — |
| Resin D *11 | — | — | — | — | — | — | — | — | — | 4 | — |
| Resin E *12 | — | — | — | — | — | — | — | — | — | — | 4 |
| Resin F *13 | — | — | — | 4 | — | — | — | — | — | — | — |
| stearic acid | 1.5 | 1.5 | 1.5 | 1.5 | 1.5 | 1.5 | 1.5 | 1.5 | 1.5 | 1.5 | 1.5 |
| zinc oxide | 2 | 2 | 2 | 2 | 2 | 2 | 2 | 2 | 2 | 2 | 2 |
| antioxidant *16 | 1 | 1 | 1 | 1 | 1 | 1 | 1 | 1 | 1 | 1 | 1 |
| Vulcanization accelerator C *21 | 05 | 0.5 | 0.5 | 0.5 | 0.5 | 0.5 | 0.5 | 0.5 | 0.5 | 0.5 | 0.5 |
| Vulcanization accelerator D *22 | 0.2 | 0.2 | 0..2 | 0.2 | 0.2 | 0.2 | 0.2 | 0.2 | 0.2 | 0.2 | 0.2 |
| sulfur | 1 | 1 | 1 | 1 | 1 | 1 | 1 | 1 | 1 | 1 | 1 |
| Results of evaluation | | | | | | | | | | | |
| tan δ (0° C.) (index) | 100 | 97 | 103 | 108 | 116 | 108 | 110 | 114 | 117 | 108 | 118 |
| storage modulus (E') (index) | 100 | 102 | 95 | 109 | 105 | 111 | 110 | 108 | 106 | 114 | 106 |

TABLE 2-continued

| Example | | | | 19 | 20 | 21 | 22 | 23 | 24 | 25 | 26 |
|---|---|---|---|---|---|---|---|---|---|---|---|
| Comparative Example | 12 | 13 | 14 | | | | | | | | |
| steering stability on dry road surfaces | 5 | 5 | 4 | 7 | 8 | 7 | 7 | 7 | 6 | 9 | 7 |
| braking property on wet road surfaces (index) | 100 | 99 | 102 | 107 | 110 | 108 | 108 | 109 | 110 | 105 | 109 |

[Notes]
[19] Butadiene rubber; "BR-01"; manufactured by JSR Corporation
[20] Carbon black; N220; "SIEST 6"; manufactured by TOKAI CARBON Co., Ltd.
[21] Vulcanization accelerator C; "NOCCELOR DZ-G"; manufactured by OUCHI SHINKO CHEMICAL INDUSTRIAL Co., Ltd.; N,N-dicyclohexyl-2-benzothiazolyl sulfenamide
[22] Vulcanization accelerator D; "NOCCELOR DM"; manufactured by OUCHI SHINKO CHEMICAL INDUSTRIAL Co., Ltd.; dibenzothiazyl disulfide

INDUSTRIAL APPLICABILITY

In accordance with the present invention, the rubber composition for tires which overcomes problems arising due to the use of a highly aromatic oil having a content of polycyclic aromatic compounds (PCA) controlled to a value smaller than 3% as the process oil in place of conventional highly aromatic oils and exhibits excellent loss property and rigidity and the tire which uses the rubber composition and exhibits the excellent steering stability on dry road surfaces and the excellent braking property on wet road surfaces can be provided.

The invention claimed is:

1. A rubber composition for tires which comprises at least one rubber component selected from natural rubber and synthetic rubbers and, based on 100 parts by mass of the rubber component, 45 to 150 parts by mass of carbon black, 5 to 20 parts by mass of (A) a terpene phenol resin and 1 to 150 parts by mass of (B) a softener comprising a process oil which comprises polycyclic aromatic compounds (PCA) in an amount such that a content of extracts with dimethyl sulfoxide (DMSO) in accordance with a method of IP346 is controlled to a value smaller than 3%,
wherein a softening point of the terpene phenol resin of Component (A) is in a range of 100 to 150° C. and an OH-value (KOH mg/g) of the terpene phenol resin of Component (A) is 40 to 150, and
wherein the softener of Component (B) comprises hydrogenated naphthenic oil, and asphalt having a kinematic viscosity of 300 mm$^2$/sec or smaller at 120° C. and comprising 5% by mass or smaller of asphaltene, and a ratio of amounts by mass of the hydrogenated naphthenic oil to the asphalt is in a range of 95/5 to 5/95.

2. A rubber composition for tires according to claim 1, wherein the hydrogenated naphthenic oil is obtained by hydrogenation of naphthenic oil having a content of naphthenic hydrocarbons (% CN) of 30 or greater as measured in accordance with a method of ASTM D4210.

3. A tire which has a tread consisting of the rubber composition according to claim 1.

* * * * *